United States Patent [19]

Asano et al.

[11] 3,750,008
[45] July 31, 1973

[54] OPTICAL PUMPING MAGNETOMETER

[75] Inventors: Hiroshi Asano; Makoto Kikuchi; Hideo Takeuchi; Michimasa Kondo, all of Kamakura, Japan

[73] Assignee: Mitsubishi Denki Kabushiki Kaisha, Tokyo, Japan

[22] Filed: Oct. 4, 1971

[21] Appl. No.: 186,050

[30] Foreign Application Priority Data
Oct. 2, 1970 Japan.................................. 45/86428

[52] U.S. Cl................................................ 324/0.5 R
[51] Int. Cl............................................ G01r 33/08
[58] Field of Search...................... 324/0.5 E, 0.5 F, 324/0.5 G

[56] References Cited
UNITED STATES PATENTS
3,158,802    11/1964    Jung.................................. 324/0.5 E Primary Examiner—Michael J. Lynch
Attorney—Norman F. Oblon, Marvin J. Spivak et al.

[57] ABSTRACT

An optical pumping magnetometer has a sensing portion and a pair of coils fixed thereto for receiving an A.C. current for modulating an ambient magnetic field. A two axis gimbal is provided for holding the sensing portion and the pair of coils at any desired direction. A frequency discriminator connects the modulated ambient magnetic field into a corresponding voltage signal and phase sensitive detector means are provided and serve to compare the voltage signal so generated with the A.C. current passing through the pair of coils. Driver means are provided to drive the gimbal in accordance with the output of the phase sensitive detector means such that the sensing portion is automatically controlled so as to maintain a specific angle to the direction of the ambient magnetic field.

8 Claims, 7 Drawing Figures

INVENTORS
HIROSHI ASANO
MAKOTO KIKUCHI
HIDEO TAKEUCHI
MICHIMASA KONDO

BY
Oblon, Fisher & Spivak
ATTORNEY

OPTICAL PUMPING MAGNETOMETER

BACKGROUND OF THE INVENTION

1. Field of the Invention

This invention relates to an optical pumping type magnetometer in which the absorption of light at the resonance frequency is proportional to a magnetic field intensity to be measured.

2. Description of the Prior Art

FIG. 1 shows a schematic block diagram of a prior art conventional self-oscillating optical pumping magnetometer, which includes a sensor 9, an RF amplifier 7 and a phase shifter 8. The sensor 9 includes a spectrum lamp 1 for emitting light 10 lenses 2 and 2', an absorption cell 3, an RF coil 4, a circular polarizer 5 and a photodetector 6.

In the conventional self-oscillating optical pumping magnetometer, the light 10 emitted from the spectrum lamp 1 is made parallel by the lens 2 and is then passed through the circular polarizer 5 where it is converted to a circularly polarized light, and then is projected to the absorption cell 3. The light 10 which is passed through the absorption cell 3 is then focused by the lens 2' to enable the light to be converted into an electrical signal by the photodector 6. The electrical signal so generated is then matched in phase relationship by the phase shifter 8, and is amplified by the RF amplifier 7. The amplified signal is fed back through the RF coil 4 to the absorption cell 3 in the form of a high frequency magnetic field. In the absorption cell 3, certain elements having a very short life time at an excited state, such as an alkali metal, are charged in the sealing. By way of example, cesium atoms Cs may be used as the alkali metal which is charged in the sealing of the absorption cell 3. The kinetic energy of the cesium atoms are shown in corresponding energy levels in FIG. 2. From FIG. 2, it is seen that when the spectrum lamp 1 only emits an amount of light $D_1$ having a wave length of 8943.5A. that the cesium atoms responding to the $D_1$ light in the absorption cell 3 will be in the transition state of $^2S_{1/2} \rightarrow {}^2P_{1/2}$.

Now, it should be understood that when the magnetometer system shown in FIG. 1 is in a static magnetic field, the cesium atoms in the absorption cell will provide a Zeeman Splitting effect. This phenomenon is shown in FIG. 2 wherein the different Zeeman energy sublevels are shown in proportion to the magnetic field intensity. When the cesium atoms are in the Zeeman Sublevel transitions of $^2S_{1/2} \rightarrow {}^2P_{1/2}$, movement under the selective rule of quantum mechanics will occur. Thus, after the cesium atoms stay in the excitation state of $^2P_{1/2}$ for an instant of time, the same will naturally return to the $^2S_{1/2}$ state. As the above movement is repeated, the cesium atoms in the absorption cell 3 will eventually provide a specific polarization which is higher than the Zeeman Sublevel of $^2S_{1/2}$ in the ground state. This polarization is shown in FIG. 2, wherein most of the atoms are concentrated to the state of $m=-3$ on $F=3$ of $^2S_{1/2}$.

Now, when an oscillating magnetic field is provided, which is oscillated at a frequency corresponding to the difference of the Zeeman Sublevel in the magnetic field intensity under the polarization, the so-called "stimulated transition" will occur whereby the cesium atoms will return to their initial state of random distribution in the Zeeman Sublevel at the ground state. As the light $D_1$ is continuously projected, the transitions from $^2S_{1/2} \rightarrow {}^2P_{1/2} \rightarrow {}^2S_{1/2}$ will continuously occur. The following are Bloch's known equations for representing the microscopic expression for the transition process which includes a light excitation factor.

$$(dM_x/dt) + \gamma[IH \times IM]_x + (M_x/S_2) = M_o'/S_2 \tag{1}$$

$$(dM_y/dt) + \gamma[IH \times IM]_y + (M_y/S_2) = M_o''/S_2 \tag{2}$$

$$(dM_z/dt) + \gamma[IH \times IM]_z + (M_z/S_1) = M_o/S_1 \tag{3}$$

$$S_1 = (P_x + P_y + P_z + T_1^{-1})^{-1} \tag{4}$$

$$S_2 = (P_x + P_y + P_z + T_1^{-1})^{-1} \tag{5}$$

$$M_o' = m_o' P_x S_2 \qquad M_o'' = m_o' P_y S_2 \qquad M_o = m_o P_z S_1 \tag{6}$$

wherein:

$P_x$, $P_y$, $P_z$ each respectively represents a ratio of light pumping; $m_o$, $m_o'$, $M_o$, $M_o'$, $M_o''$, each respectively represents constants decided by the factors $P_x$, $P_y$, $P_z$;

$T_1$ represents longitudinal relaxation time;

$T_2$ represents transverse relaxation time;

$M_x$, $M_y$, $M_z$ respectively represent the magnetic moment of each atom;

IH represents a magnetic field in which $H_x = H_1 \cos \omega t$, $H_y = -H_1 \sin \omega t$ and $H_z = H_o$.

$H_o$ : ambient magnetic field;

$x$, $y$, $z$ respectively represent components of a three dimensional quadrature coordinate system wherein the $z$-axis corresponds to the direction of the ambient magnetic field $H_o$.

In the system of FIG. 1, when the photosignal projected on the photodetector 6 is shown as $S_1$, the following formulas are provided.

$$S = S_x + S_y + S_z \tag{7}$$

$$S_x = A_o P_x - m_o' \quad M_x P_x/A_o \tag{8}$$

$$S_y = A_o P_y - m_o' \quad M_y P_y/A_o \tag{9}$$

$$S_z = A_o P_z - m_o M_z P_z/A_o \tag{10}$$

wherein:

$S_z$ represents the photosignal component provided by the light component being in the same direction as that of the ambient magnetic field;

$S_x$ represents the light component which is in quadrature to the ambient magnetic field and in the phase including the ambient magnetic field and the oscillating magnetic spectrum;

$S_y$ represents the light component which is in quadrature to both the ambient magnetic field and the oscillating magnetic spectrum.

If it were assumed that the ambient magnetic field $H_o$ changes slowly in comparison with the longitudinal relaxation time $T_1$ and the conditions of $H_x = H_1 \cos \omega t$, $H_y = -H_1 \sin \omega t$, and $H_z = H_o$ exist in the above formulas (1), (2) and (3), then the magnetic moment of each atom can be represented by the following formulas.

$$M_x = \frac{M_o \gamma H_1 S_2 \sqrt{1+(\Delta\omega S_2)^2} \cos(\omega t + \textcircled{H}_x)}{1+(\Delta\omega S_2)^2 + \gamma^2 H_1^2 S_1 S_2} \quad (11)$$

$$M_y = \frac{M_o \gamma H_1 S_2 \sqrt{1+(\Delta\omega S_2)^2} \cos(\omega t + \textcircled{H}_y)}{1+(\Delta\omega S_2)^2 + \gamma^2 H_1^2 S_1 S_2} \quad (12)$$

$$M_z = M_o \frac{1+(\Delta\omega S_2)^2}{1+(\Delta\omega S_2)^2 + \gamma^2 H_1^2 S_1 S_1} \quad (13)$$

wherein:

$$\textcircled{H}_x = \tan^{-1}(1/\Delta\omega S_2)$$

$$\textcircled{H}_y = \tan^{-1}\Delta\omega S_2$$

$$\Delta\omega = \omega_o \sim \omega'$$

$\omega_o = \gamma H_o$ which is the angular frequency corresponding to the difference of the Zeeman sublevel in the magnetic field $H_o$; $\gamma$ represents the gyromagnetic ratio.

When the formulas (11), (12) and (13) are respectively applied to the formulas (8), (9) and (10), the following formulas are provided.

$$S_x = A_o P_x - \frac{m'_o P_x}{A_o} \cdot \frac{M_o \gamma H_1 S_2 \sqrt{1+(\Delta\omega S_2)^2} \cos(\omega t + \textcircled{H}_x)}{1+(\Delta\omega S_1)^2 + \gamma^2 H_1^2 S_1 S_2} \quad (14)$$

$$S_y = A_o P_y - \frac{m_o' P_y}{A_o} \cdot \frac{M_o \gamma H_1 S_2 \sqrt{1+(\Delta\omega S_2)^2} \cos(\omega t + \textcircled{H}_y)}{1+(\Delta\omega S_2)^2 + \gamma^2 H_1^2 S_1 S_2} \quad (15)$$

$$S_z = AP - \frac{m_o P_z}{A_o} \cdot \frac{1+(\Delta\omega S_2)^2}{1+(\Delta\omega S_1)^2 + \gamma^2 H_1^2 S_1 S_2} \quad (16)$$

As is clear from the formulas (14), (15) and (16), $S_x$ and $S_y$ include the RF signal of $\cos \omega t$, while the signal $S_z$ provided by the light component which is in the same direction as that of the ambient magnetic field, is direct current light. Usually, $S_x$ and $S_y$ are designated as the modulated light and $S_z$ is designated as the absorbed light. It should be understood that only the signals $S_x$ and $S_y$ are passed through the loop in the system shown in FIG. 1, since an RF amplifier 7 is used as the amplifier for feedback. When the modulated light signals $S_x$ or $S_y$ are positively fed back to the RF coil 4 by controlling the phase shifter 8 in the system shown in FIG. 1, the system will be self-oscillated at the angular frequency $\omega_o$ which corresponds to the difference in the Zeeman Sublevels depending upon the ambient magnetic field $H_o$, since $\Delta\omega = 0$. Accordingly, when the oscillation frequency $\omega_o$ is accurately measured, the ambient magnetic field $H_o$ can be accurately calculated, whereby the system shown in FIG. 1 can be used as a magnetometer.

The self-oscillating optical pumping magnetometer shown in FIG. 1 has been found to be somewhat satisfactory in that because of high sensitivity a small change of the magnetic field can be measured with high accuracy and the absolute amount of the magnetic vector can be continuously measured. However, the conventional magnetometer as described has been found to have certain disadvantages.

The disadvantages of the conventional magnetometer become clear when the following is understood. Thus, it is seen from the formulas (6), (14), (15) and (16), that the coefficient of $\cos \omega t$ will be 0 and the oscillating component will be 0 when the ratio of the modulated light pumped in the Z direction $P_z$ is 0. In the system shown in FIG. 1, $S_x$, $S_y$ and $S_z$ can be provided with light in one direction. The absorbed light $S_z$ and the modulated light $S_x$ or $S_y$ are then changed depending upon the change of the angle $\theta$ of the direction of the magnetic field $H_o$ to the direction of the light in the system shown in FIG. 1. The amplitude of the self-oscillation is also changed depending upon the change of the angle $\theta$. This condition of change is shown in FIG. 3, wherein the change is the product of the $\cos \theta$ of the rate of $S_z$ change and the $\sin \theta$ of the rate of the $S_x$ or $S_y$ change.

The oscillation-amplitude $a\theta$ at a certain angle $\theta$, can be shown as $$a_\theta = |K \cos \theta \cdot \sin \theta|$$

wherein K is a constant.

In FIG. 3, the change of $a\theta$ with regard to $\theta$ is shown and it should be noted that when $a\theta = 0$, the oscillation is stopped when $\theta = 0°, 90°, 180°$ and $270°$. It is thus difficult to provide an appropriate $a\theta$ *for self-oscillation* when $\theta$ *is near* $0°, 90°, 180°$ and $270°$, and as such no oscillation will be provided during certain ranges of $\theta$. The maximum $a\theta$ is provided at 45° of the angle of the ambient magnetic field to the light axis of the magnetometer and this angle is therefore the most suitable for actual operation. The locus of $a\theta$ is shown by the dotted line in FIG. 3 and is provided when the phase of the feedback loop in the magnetometer is inverted. At such time, no oscillation will occur in the region shown in the solid line. It should be understood that the operative range of the conventional magnetometer is usually about 30° from the conical surface and has a top angle of 45° to the light axis. Accordingly, when the magnetometer is used for measurement of the earth's magnetism (earth's magnetic force) by carrying the magnetometer in an airplane or the like, the magnetometer will not be operable for certain areas, if the magnetometer is fixed to a specific angle. Even in an operable area, the self-oscillation of the magnetometer will be stopped each time the airplane is slanted over a specific angle. In order to overcome the above disadvantages of the prior art, various other means have been proposed as follows.

A plurality of magnetometers have been combined so that no oscillation stopping angles will appear in the total assembly. Also, a single sensor magnetometer has been held on a gimbal system and the information flux of the earth's magnetic force is provided from another sensor, such as a saturable core type magnetometer (which has substantially high sensitivity in the direction of the earth's magnetism), a gyrocompass or a magnetic compass, so as to maintain the best operational angle of the sensor of the magnetometer to the earth's magnetic field by a servo-control system. Again while somewhat satisfactory, in the system using a plurality of magnetometers, the sensors of the magnetometers, which are precision type instruments, are of a large size and in comprehensive form, and thus a small difference in the characteristics of each of the sensor will adversely effect the total operation. On the other hand, in the system for holding the single sensor of the magnetometer in a gimbal system, another type of sensor for detecting the direction of the earth's magnetic fields is required.

In addition, when the saturable core type magnetometer is provided in the gimbal system for the sensor of the magnetometer, a high excitation has to be provided because of the magnetic forces present and the operation of the saturable core type magnetometer such that there is a high possibility of operational trouble being caused in the sensor of the magnetometer. In the system using the gyrocompass, the gyrocompass is substantially not a sensor of the magnetometer and thus a large error may be caused thereby. In the system using the magnetic compass, the magnetic compass is a ferromagnetic material whereby is has to be separated from the sensor of the magnetometer and placed at a large distance therefrom. Moreover, the magnetic compass arrangement is an open loop system, as is the gyrocompass case, and accordingly, it is difficult to provide control with high accuracy.

As stated above, it should now be apparent that additional components are required for the conventional plurality type magnetometers, while a sensor for detecting the magnetic field is required in the gimbal controlling system. Thus, various disadvantages of unreliability of apparatus, weight and cost problems have existed in such systems.

BRIEF DESCRIPTION OF THE DRAWINGS

A more complete appreciation of the invention will be readily obtained as the same becomes better understood by reference to the following detailed description when considered in connection with the accompanying drawings wherein.

DETAILED DESCRIPTION OF THE PREFERRED EMBODIMENTS

Figure 1:
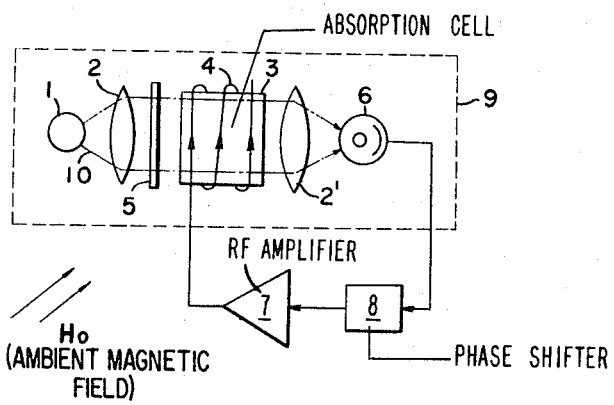
FIG. 1 is a schematic block diagram of a conventional self-oscillating optical pumping magnetometer.
Figure 2:
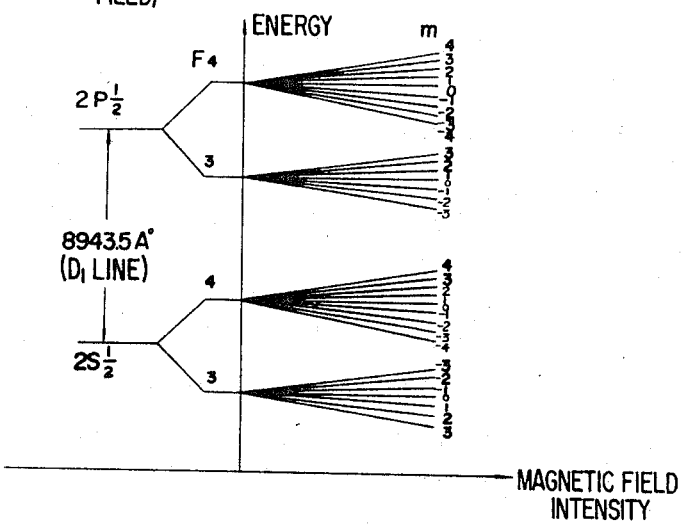
FIG. 2 is a graph for explaining the principle of the operation of the conventional magnetometer of FIG. 1.
Figure 3:
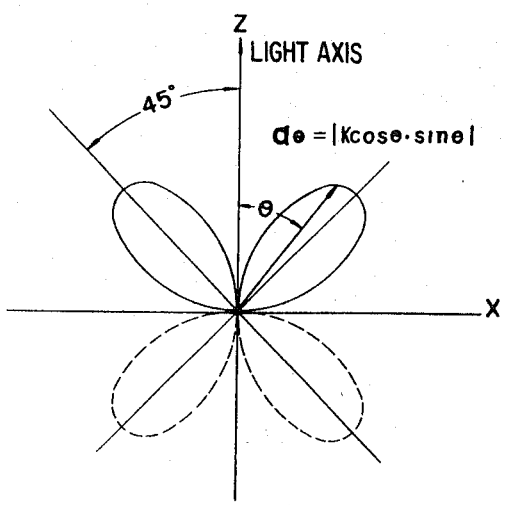
FIG. 3 is a graph for explaining the characteristics of the conventional magnetometer of FIG. 1.
Figure 4:
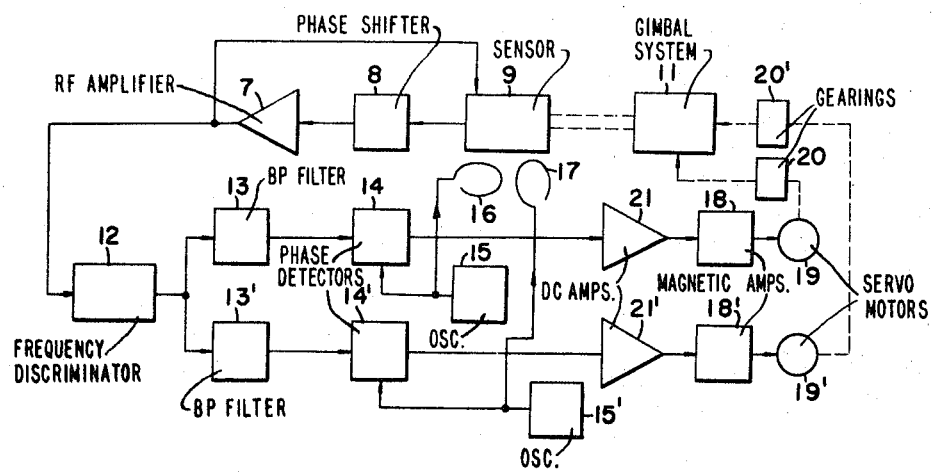
FIG. 4 is a schematic block diagram of one preferred embodiment of a magnetometer in accordance with this invention.

Referring now to the drawings wherein like reference numerals designate identical or corresponding parts throughout the several views, and more particularly to FIG. 4 thereof wherein is shown a nondirectional optical pumping magnetometer including a sensor 9 of the magnetometer, which is a detector of the magnetic field intensity, and includes the same components as described with reference to FIG. 1. An RF amplifier 7 and a phase shifter 8 are provided and are generally separated a distance of 1–2m from the sensor 9 of the magnetometer so as to prevent any magnetic noise from being applied thereto. A gimbal system 11 having a 2 axis gimbal structure for holding the sensor of the magnetometer at the center thereof is provided. The output of the RF amplifier 7 will provide an oscillating signal having a frequency which is proportional to the ambient magnetic field intensity. When an alkali metal such as cesium is charged in the absorption cell of the sensor 9 the frequency will be for example, $f_o = 3.5 \times 10^5$ $H_o$ [$H_z$], wherein $H_o$ represents the ambient magnetic field intensity (Gauss). A magnetic field modulation voltage, such as of several hundred $H_z$, is provided from a pair of oscillators 15, 15' to two coils 16, 17, respectively, and accordingly, the output signal of the RF amplifier 7 includes frequency modulated signals corresponding to the magnetic field modulation. The signals at the output of the RF amplifier 7 are supplied to a frequency discriminator 12 which provides an output by converting the change of frequency of the input signals thereto to a change of voltage. The magnetic modulated signals will thus appear as a voltage signal at the output of the discriminator 12. The magnetic modulates signals provided from the two oscillators 15, 15' have respectively different frequencies from each other. The output signal of the frequency discriminator 12 is applied through a pair of corresponding bandpass filters 13, 13' to a pair of corresponding phase sensitive detectors 14, 14'. Each of the phase detectors 14, 14' has two input terminals and provide an output D.C. potential corresponding to the phase difference between the input signals thereto from the bandpass filters 13, 13' and the voltages from the oscillators 15, 15'. The compared outputs are D.C. potentials which are applied to D.C. amplifiers 21, 21' wherein the same are amplified and applied to a pair of magnetic amplifiers 18, 18'. The magnetic amplifiers 18, 18' serve to invert the sense of the output A.C. voltages therefrom by sensing the input D.C. potentials. The output A.C. voltages are respectively provided to each control winding of each of a pair of servomotors 19, 19'. Accordingly, the servomotors can reverse their direction of rotation depending upon the sense of the output D.C. potentials of the phase detectors 14, 14'. The shaft of the servomotors 19, 19' are mechanically connected through a respective pair of gear boxes 20, 20', to each of the two axes of the gimbal system 11.

Figure 5:
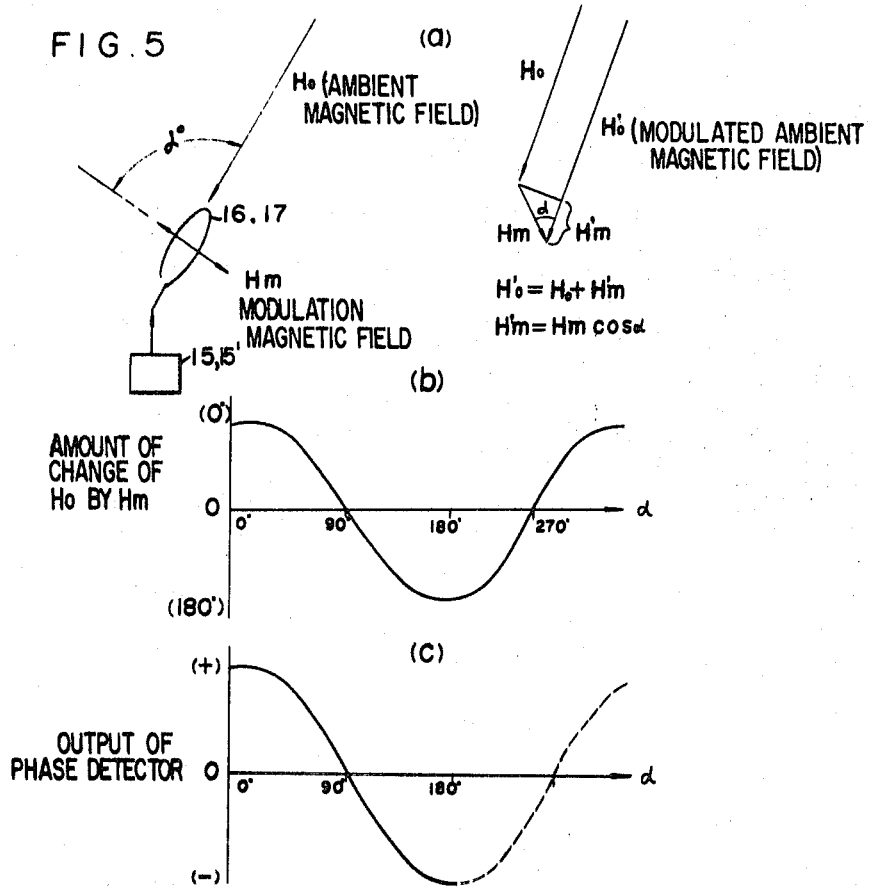
FIGS. 5a, 5b and 5c are graphs for explaining the principles of the operation of the magnetometer of this invention.

Referring now to FIG. 5a, it will be apparent that when an A.C. current is supplied to the coils 16, 17 to thereby result in a modulated magnetic field, any change in the ambient magnetic field direction can be substantially ignored, if the modulation magnetic field is quite small in comparison with the ambient magnetic field. When the modulated magnetic field is considered to consist of only quadrature components to the face of the coils 16, 17, the ambient magnetic field $H_o$ is modulated by the value of H $m \cos\alpha$ depending upon the angle $\alpha$ of the ambient magnetic field to the magnetic line of the modulated magnetic field, as shown in FIG. 5b. In FIG. 5b, the designations of 0° and of 180° on the vertical axis refer to the fact that the phase of the modulated signal voltage demodulated by the discriminator 12, which represents a change in the voltage of the oscillators 15, 15' in the modulated ambient magnetic field, is 0° or is inverted to 180°. Accordingly, the output D.C. potentials of the phase detectors 14, 14' are inverted to a positive or a negative potential corresponding to the phase inversion of the input signal. It should be understood that as the amplitude of the input signal is changed by $\cos\alpha$, the output is also changed. This phenomenon is clearly shown in FIG. 5c.

Figure 6:
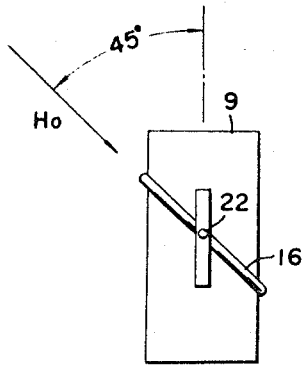
FIGS. 6 and 7 are schematic views of the preferred embodiment of this invention.
Figure 6:
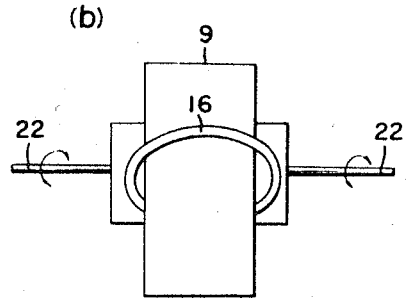

Referring now to FIG. 6, it is seen that a coil 16 is fixed to the sensor 9 of the magnetometer at an angle of 45° of the coil face to the light axis of the sensor 9 of the magnetometer. The axis of an inner gimbal 22 is fixed to the sensor 9 of the magnetometer in quadrature to the light axis and in parallel to the face of the coil 16. When the axis of the inner gimbal 22 is rotated by a servomotor through a gear box (in FIG. 6, the bearing, gear box, etc., are not shown) and the phase sense of the total system (servo loop) is adjusted to result in a negative feedback operation, the servomotor will be stopped at 0 output voltage of the phase detector. This is at 90° of $\gamma$ in FIG. 5, wherein the face of the coil 16 is in parallel to the ambient magnetic field (the ambient magnetic field direction being in a region wherein the oscillation of the magnetometer is not stopped.

Accordingly, when the ambient magnetic field direction is changed by the direction of rotation of the axis of the inner gimbal 22, the servo loop is followed so as to always keep at an angle of 45° of the ambient magnetic field to the light axis of the sensor 9 of the magnetometer. In order to follow the change of slant of the ambient magnetic field to the direction in parallel to the axis of the inner gimbal 22, the axis of the outer gimbal must be in quadrature to the axis of the inner gimbal 22.

Figure 7:
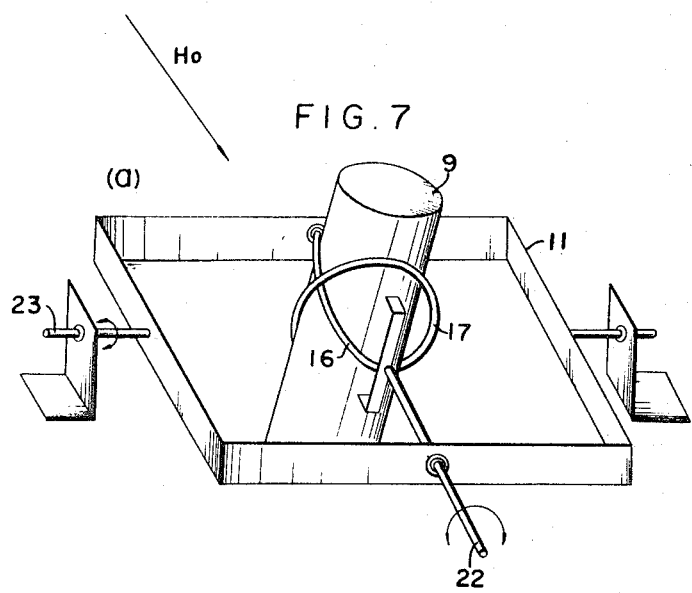
Figure 7:
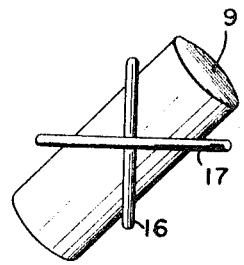
Figure 7:
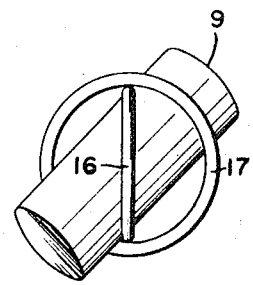

FIG. 7 shows a schematic view of a gimbal system which is capable of following the angle change at all directions of the ambient magnetic field. A coil 17 is placed in quadrature to the coil 16 and both of the coils have the same center, and are fixed to the sensor 9 of the magnetometer so as to be at an angle of 45° of the light axis of the sensor 9 of the magnetometer to the line including the point of intersection of both of the coils 16 and 17. The axis of the inner gimbal 22 is in quadrature to the axis of an outer gimbal 23. The axis of the inner gimbal 22 is in parallel to the face of the coil 16, while the axis of the outer gimbal 23 is in parallel to the face of the coil 17. Any error of the ambient magnetic field direction detected by the coil 16 is prevented by controlling the rotation of the axis of the inner gimbal 22 by the first servo loop of FIG. 4 which is responsive to a signal detected by the coil 16. Any error detected by the coil 17 is also prevented by controlling the rotation of the axis of the outer gimbal 23 by the second servo loop of FIG. 4. Accordingly, when the two servo loops are fully actuated, the point of intersection of both of the coils 16 and 17 will always be to the direction of the magnetic field so as to hold the sensor 9 of the magnetometer at the best operational angle. It should be understood that when operating as a magnetometer, the amplitude of the modulation signal in the information signal will be decreased. For example, in an ideal case the modulated magnetic field intensity may be 100 $\gamma$ (1$\gamma$ = $10^{-5}$ Gauss) and the amplitude of the modulation signal included in the information signal may be calculated to be about 0.1$\gamma$ (as $H_o$ = 0.4 Gauss, $H_m$ = 100 $\gamma$, $\alpha$ = 90°). The effect of the modulation signal is easily removed by passing the same through the low pass filters, when utilizing it as a magnetometer by voltage conversion of the information signal.

The frequency of the modulated magnetic field voltage should be decided in accordance with the sensor 9 of the magnetometer. Although a different frequency is selected for the two oscillators 15, 15', so that the two servo loops will be independently operable, it is possible to operate the two servo systems by having their outputs 90° out of phase from one another by assuring that the phase detector 14 is always 0 when the phase difference of the two inputs of the phase detector 14 is 90°.

In the embodiments shown in FIGS. 6 and 7, a solenoid type coil is used, however, it is possible to use other types of coils depending upon the requirements of easy assembly, accuracy, uniformity of the generated magnetic field and the like.

In the above-mentioned embodiments, only a self-oscillating optical pumping magnetometer is illustrated. It should be apparent that the invention is not so limited and can be applied for the automatic frequency control type of optical pumping magnetometer, by modifying the angles, and the like.

As stated above, in accordance with the present invention, it is now apparent that a nondirectional magnetometer can be obtained with a single optical pumping magnetometer. Also, a magnetometer is provided having excellent advantages in reliability, size, weight, cost and magnetic noise in comparison with conventional magnetometers since there is no need to have a specific sensor for holding it at the best operational angle.

Obviously, numerous modifications and variations of the present invention are possible in light of the above teachings. It is therefore to be understood that within the scope of the appended claims the invention may be practiced otherwise than as described herein.

What is claimed as new and desired to be secured by letters patent of the United States is:

1. An optical pumping magnetometer comprising:
  a self-oscillating, optically pumped sensor for measuring the intensity of magnetic fields;
  a pair of coils fixed to said sensor for receiving an A.C. current for modulating an ambient magnetic field;
  a gimbal means for holding said sensor and said coils at any desired direction;
  a frequency discriminator coupled to the output of said sensor for converting the output signal of said sensor, indicating the ambient magnetic field measured by said sensor, to a voltage signal;
  phase sensitive detector means for comparing phase between said voltage signal and said A. C. current passing through said coils; and
  driver means for driving said gimbal means in accordance with the output of the phase sensitive detector means, whereby said sensor is always controlled to keep a specific angle to the ambient magnetic field direction.

2. An optical pumping magnetometer as in claim 1, wherein said gimbal means has two axes.

3. An optical pumping magnetometer as in claim 1, wherein said gimbal means has an inner gimbal which is in quadrature to an outer gimbal and wherein each of said pair of coils are parallel to one of said gimbals.

4. An optical pumping magnetometer as in claim 1, wherein said phase sensitive detector means includes a first phase sensitive detector and a second phase sensitive detector.

5. An optical pumping magnetometer as in claim 4, wherein said driver means includes a first servomotor and a second servomotor.

6. An optical pumping magnetometer as in claim 5, wherein both said first and said second servomotors are connected to said gimbal means through respective first and second gear boxes.

7. An optical pumping magnetometer as in claim 6, wherein a first oscillator and a second oscillator are provided for providing the A.C. current for modulating said ambient magnetic field.

8. An optical pumping magnetometer as in claim 7, wherein said first and said second oscillators have different frequencies.

* * * * *